US008345827B2

(12) United States Patent
Liebermann et al.

(10) Patent No.: US 8,345,827 B2
(45) Date of Patent: *Jan. 1, 2013

(54) SIGN LANGUAGE PUBLIC ADDRESSING AND EMERGENCY SYSTEM

(76) Inventors: Joshua Elan Liebermann, Meriden, CT (US); Raanan Liebermann, North Haven, CT (US)

( * ) Notice: Subject to any disclaimer, the term of this patent is extended or adjusted under 35 U.S.C. 154(b) by 1181 days.

This patent is subject to a terminal disclaimer.

(21) Appl. No.: 12/002,252

(22) Filed: Dec. 14, 2007

(65) Prior Publication Data

US 2008/0144781 A1    Jun. 19, 2008

Related U.S. Application Data

(60) Provisional application No. 60/875,777, filed on Dec. 18, 2006.

(51) Int. Cl.
*H04M 11/04* (2006.01)
(52) U.S. Cl. .......................................... 379/48
(58) Field of Classification Search .................. 379/48
See application file for complete search history.

(56) References Cited

U.S. PATENT DOCUMENTS

| 7,774,194 | B2* | 8/2010 | Liebermann et al. ............. 704/7 |
| 7,987,510 | B2* | 7/2011 | Kocher et al. ................... 726/27 |
| 2001/0016942 | A1* | 8/2001 | Harrison et al. ............... 725/36 |
| 2001/0017598 | A1* | 8/2001 | Townsend et al. ......... 342/357.1 |
| 2001/0038339 | A1* | 11/2001 | McKenzie et al. ....... 340/825.36 |
| 2002/0161582 | A1* | 10/2002 | Basson et al. ................. 704/260 |
| 2003/0212821 | A1* | 11/2003 | Gillies et al. ................. 709/238 |
| 2003/0235286 | A1* | 12/2003 | Goldman ...................... 379/243 |
| 2004/0110469 | A1* | 6/2004 | Judd et al. ....................... 455/15 |
| 2005/0030977 | A1* | 2/2005 | Casey et al. .................. 370/485 |
| 2005/0215238 | A1* | 9/2005 | Macaluso .................. 455/414.1 |
| 2010/0107192 | A1* | 4/2010 | Sennett et al. .................. 725/33 |

* cited by examiner

*Primary Examiner* — Alexander Jamal

(57) ABSTRACT

A public addressing and emergency system has a person or message signal generator for generating a message whose contents comprise at least one of a sign language message, a voice message, and a text message and a transmitting system for transmitting the message signal to at least one of a mobile unit and at least one fixed display unit in at least one location. The message signal transmitting system is bi-directional enabling bi-directional message communication and may include a device such as a splitter for generating multiple signals and/or a device such as a booster for increasing or maintaining the power of the signals. The public addressing system can be independent, or tied in with internal processing of commercial entities and their electronic displays to present advertising and educating the public about the emergency system.

31 Claims, 4 Drawing Sheets

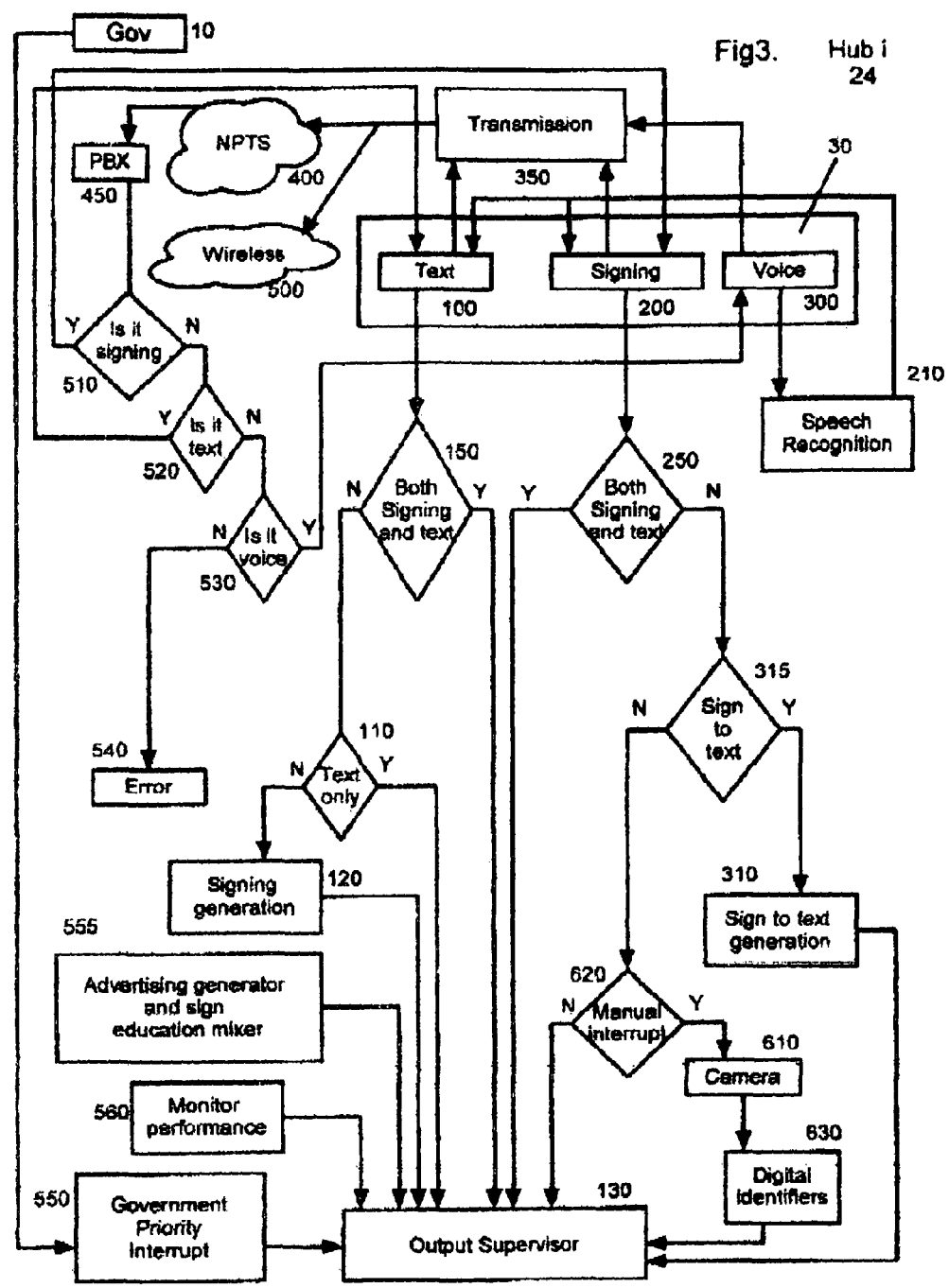

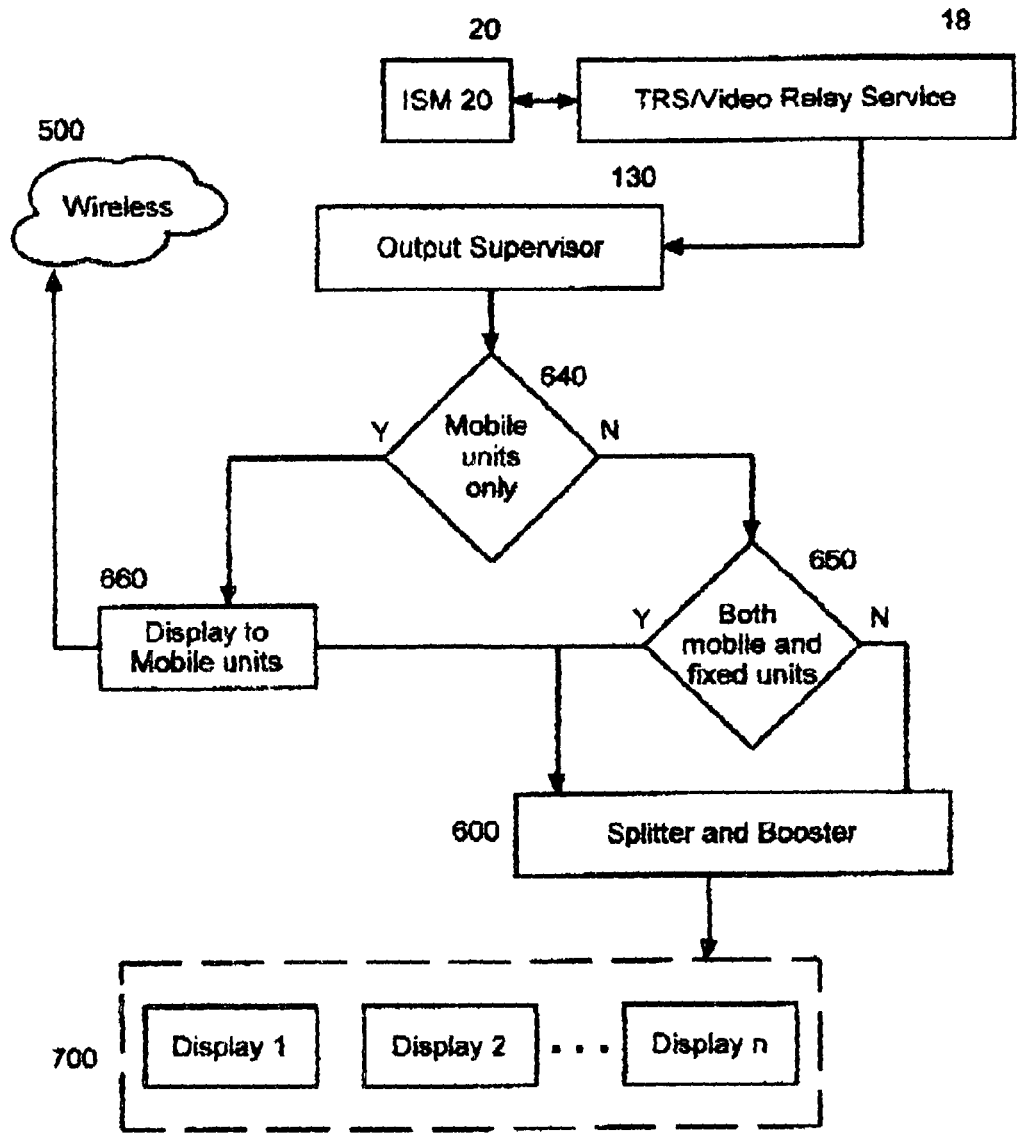

SIGN LANGUAGE PUBLIC ADDRESSING AND EMERGENCY SYSTEM

CROSS-REFERENCE TO RELATED APPLICATION(S)

This application claims the benefit of U.S. Provisional Patent Application Ser. No. 60/875,777, entitled SIGN LANGUAGE PUBLIC ADDRESSING AND EMERGENCY SYSTEM, filed on Dec. 18, 2006.

BACKGROUND (1) Field of the Invention

The present invention relates to a sign language public addressing and emergency system for the hearing impaired and others.

(2) Prior Art

Our society has both hearing and deaf persons. Hearing persons use a spoken language such as English, while the deaf use a visual language, e.g., sign language.

Sign language, including American sign language, is a comprehensive and distinct language in which manual gestures, body positions, body posture, arm movement, hand and finger positions, facial expressions involving eyes, eyebrows, cheeks, lips and mouth movements, are used in certain specific combinations to convey meaning. Sign language is not a form of manually coded English. Sign language has its own syntax and grammatical structure. Text cannot convey sign language.

Static pictures cannot convey sign language, since sign language is a language of expressions and movements.

Finger spelling cannot convey sign language. Finger spelling is used to spell words that cannot be signed in sign language and for names. It is the equivalent of English text letters only. Note that numbers cannot be finger spelled since they require proper movement to define their numerical meaning. Time, money and dates all have different movements. A word such as "big" used in a sentence such as "a big fire" needs to be defined as to how "big" is big by the amount of expression given.

Currently, there are public addressing systems that address the public by voice and text. However, there is no public addressing system that addresses deaf persons in sign language.

SUMMARY OF THE INVENTION

The invention described herein is for a silent public addressing system where the public is addressed by sign language, including American Sign Language with or without text, rather than voice, though voice could be added if desired. With terrorism and homeland security becoming an increasing subject of concern, it is important to ascertain that deaf individuals can be warned, informed or directed by public addressing systems like their hearing counterparts.

Our society has embraced globally hand held devices and therefore it is appropriate that such a system for warning, informing and guiding the public during emergency times should be provided both for stationary means on locations, as well as delivered through hand held means, such as mobile telephones, personal data assistants (PDAs) or laptop computers, connected to by wireless transmission or any other communication technology known in the art.

In fact, the sign language public addressing and emergency system can in certain embodiments be extended in an organized fashion to other handicapped persons who are hearing, as well as to non-handicapped persons who are hearing.

In accordance with the present invention, there is provided a public addressing and emergency system which comprises means for generating a message signal, the contents of which comprise at least one of a sign message, a voice message, and a text message and means for transmitting the message signal to at least one mobile unit and at least one display unit in at least one location and means for educating the public during non-emergency times of its value. The mobile units can be any means known in the art, such as hand held devices utilizing wireless, WIMAX, G3, WIFI, or even display units placed on carts and transported to another location where they could be properly hooked up to communication means as either an independent display or acting in the capacity of a TV that could be connected by any means known in the art, such as cable TV that can also be available for the fixed display means. The transmitting means may include a splitter for generating multiple signals and/or a booster for increasing the power of the signals.

Other details of the sign language public addressing and emergency system of the present invention, as well as other objects and advantages attendant thereto, are set forth in the following detailed description and accompanying drawings.

BRIEF DESCRIPTION OF THE DRAWINGS

FIG. 3 is a schematic representation illustrating the processes occurring in a designated hub of the public address and emergency system from the origination of a signal to its output setting.

FIG. 4 is a schematic representation illustrating the actual output of the public address and emergency system to various destinations, such as mobile devices and/or display units receiving the data from a splitter and signal enhancement booster when appropriate.

DETAILED DESCRIPTION OF THE PREFERRED EMBODIMENT(S)

Figure 1:
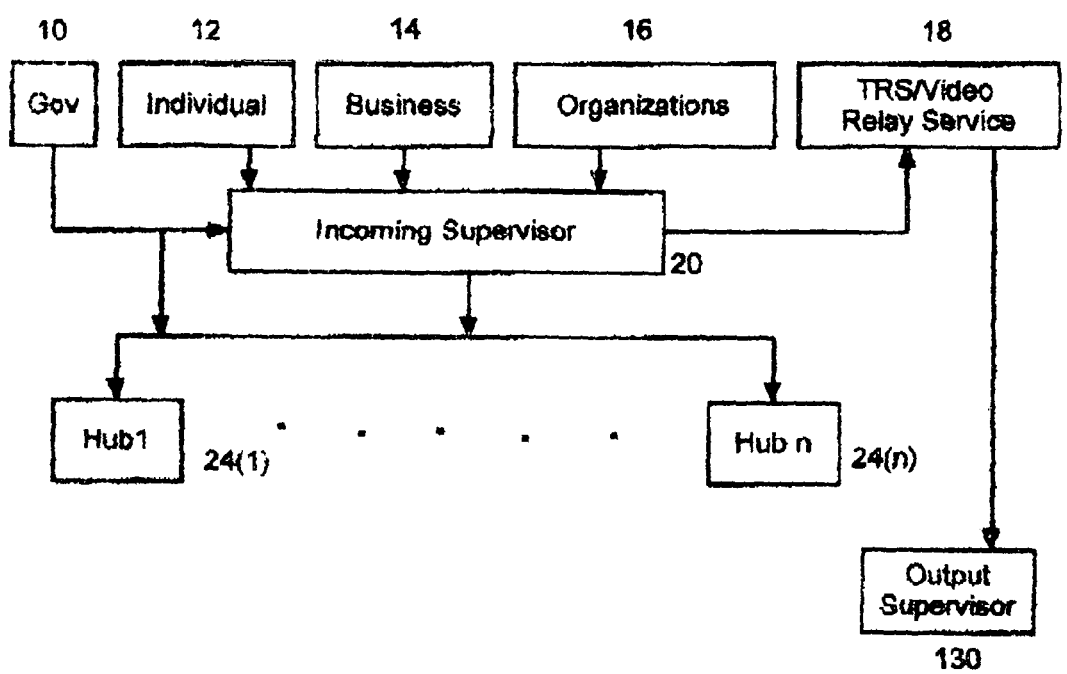
FIG. 1 is a schematic representation of a sign language public addressing and emergency system in accordance with one embodiment of the present invention.

As mentioned above, the present invention relates to a sign language public addressing and emergency system, which is particularly useful for hearing impaired individuals. The public addressing and emergency sign language system of the present invention utilizes means for transmitting sign language, with or without text, to at least one external display unit at a desired location, which location may be remote from the originating input source and could include voice. For example, a signal representative of a sign language video may be sent to a signal splitter to enable image duplication on multiple display units in a location remote from the location from which the sign language video originated. A booster to the signal may be provided to enable distance extension for the image signals to travel the needed distance. The signal splitter may deliver the sign language content, with or without text, or voice to the multiple external display units. Thus, there can be a plurality of recipients of the same signal resulting in the same images of sign language, with or without text, on their respective display units. The respective display unit could also be a display unit situated in a public area and shared by a plurality of persons. Likewise, a signal representing sign language with or without text or voice can be sent to a wireless mobile unit, such as wireless phone or a PDA utilizing wireless transmission known in the art.

If desired, the public addressing and emergency system could include selective image broadcasts, with or without text, where some display units display one type of images (messages) and another group of displays present another type of images. Voice could accompany the broadcasts if desired. An example would be a school that is being evacuated where the lower grades receive one message, while older students in higher grades are instructed to search for students left behind.

In another embodiment of the public addressing and emergency system of the present invention, sign language may be transmitted in video form, i.e. pre-recorded message, to the splitter and booster.

In still another embodiment of the public addressing and emergency system of the present invention, sign language may be transmitted in video form, i.e. pre-recorded message, to a wireless mobile unit.

In still another embodiment of the public addressing and emergency system of the present invention, sign language generated by a person may be transmitted to the splitter and the booster.

In still another embodiment of the public addressing and emergency system of the present invention, sign language generated by a person may be transmitted to a wireless mobile unit.

In still another embodiment of the public addressing and emergency system of the present invention, sign language generated by a person could occur in a Telephone Relay Service (TRS) or Video Relay Service (VRS) where voice or text could be converted to sign language and vice versa and transmitted through the means of the present invention.

In certain embodiments, the output signals from the output supervisor travel either to mobile units through such enabling means as wireless and/or to the splitter and booster from where the output signals travel to one or more display units preferably to be simultaneously displayed. The input signal to the output supervisor may be representative of text to sign language, voice to sign language, pre-recorded video of a sign language message, video from a camera of sign language, a signing person's images, a voice to text message, a text message, a signing person to text message, an interpreter signing, voice and/or video of a text message.

Referring now to the FIG. 1, the public addressing and emergency system includes an incoming supervisor/manager (ISM) 20. The ISM 20 may receive input from originators such as governmental agencies 10, individuals 12, businesses 14, organizations 16, and/or a communication system 18, such as a Telephone Relay Service (TRS) and/or a Video Relay Service (VRS). The ISM 20 determines which of the plurality of hubs 24 receives the incoming input or data as described below.

Figure 2:
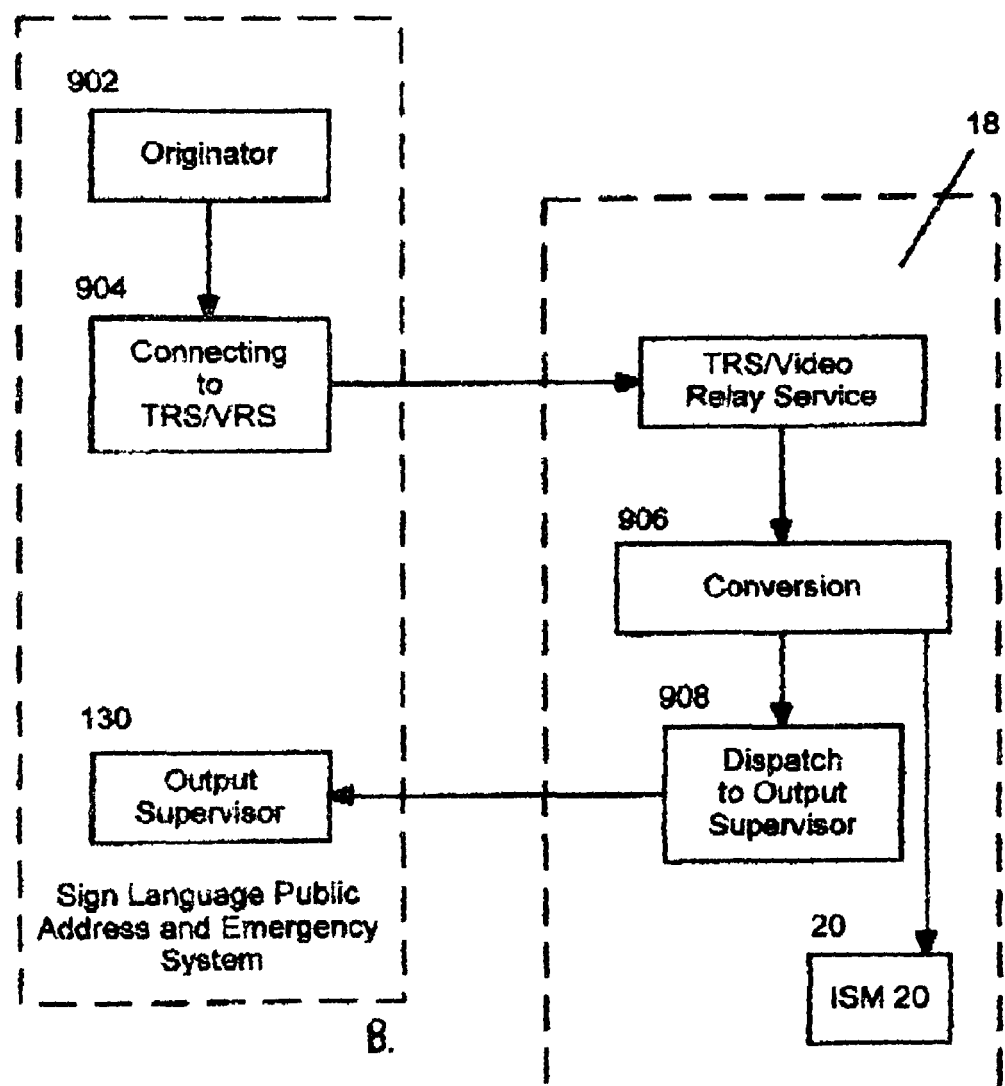
FIG. 2 is a schematic representation illustrating a way to route messages using the sign language public addressing and emergency system of FIG. 1 in an embodiment utilizing Telephone Relay Service (TRS) or Video Relay Service (VRS) to facilitate either a unidirectional or a bi-directional conversion between voice or text and sign language.

The input to the ISM 20 from the TRS or VRS in communication system 18 could come either as initiated by the TRS/VRS 18 or as a result of TRS/VRS 18 receiving first an input from the incoming supervisor/manager 20 and then processing it according to FIG. 2 and proceeding to output the result back to ISM 20 and/or directly to the output supervisor 130. Processing at TRS/VRS 18 can be done by first converting the input 906 in FIG. 2 such as by transliteration and then dispatching the conversion result in 908 to the output supervisor 130 and/or back to the ISM 20, directing it to undergo the steps in hub 24 shown in FIG. 3.

Information within each hub 24 can be generated locally under individuals 12, businesses 14 or organizations 16 and go through the ISM 20 to gain entry to either the TRS/VRS 18 or the procedure outlined in hub 24.

Upon selection of a particular hub 24, such as hub(i), the respective input or data signal moves to the appropriate hardware and software recipient in group 30 in FIG. 3. The major protagonists in group 30 are text transceiving means 100, signing transceiving means 200, and voice transceiving means 300. From group 30, each stream of data flows individually according to the path laid out in FIG. 1.

When signing data is transmitted from the signing box 200, it is queried in box 250 to see if both text and signing need to be presented in two adjacent windows on one or more of the display units 700 in FIG. 4. If the answer is affirmative, then the data proceeds to an output supervisor 130. If the answer is negative, the data proceeds to be queried in box 315 if the end destination is text. If the answer to this query is negative, then the system proceeds to check at box 620 if there is a manual interrupt, such as when the principal at school has an urgent message. If there is an interrupt, then manual signing is done in front of a camera 610 and the results are converted in box 630 to digital identifiers that are added. The output from the conversion means to digital identifiers in box 630 propagates to the output supervisor 130. If no interrupt is detected at box 620, the signing content proceeds to the output supervisor 130. If it is determined at the query in box 315 that text output is desired then the data moves to a sign to text generation means in box 310 where it is converted into text and then to the output supervisor 130.

Data from the text in box 100 is queried in box 150 to see if both text and signing are to be presented in respective adjacent windows in one or more of the display units 700. If the query is answered affirmatively, the data moves to the output supervisor 130. Otherwise, the data is queried in box 110 to see if only text is desired. If the answer to this query is affirmative, it proceeds to output supervisor 130, but if the answer to the query is in the negative, the data moves to sign language generation means 120 where the text is converted to sign language, such as American Sign Language or British Sign Language, that ends up at the output supervisor 130. Text and signing appearing simultaneously in two separate adjacent windows are treated separately, one for signing and one for text as organized by the output supervisor 130. Data from the text in box 100 is queried in box 150 as to whether the output should be with an adjacent signing window. If the answer to the query is affirmative, it is communicated directly to the output supervisor 130. Otherwise, the information proceeds to the query in box 110. Likewise, signing information data coming from box 200 is queried at box 250 as to whether it will appear on the display unit(s) by itself or as an adjacent window to the text window. If an adjacent window is desired, it is communicated directly to the output supervisor 130. Otherwise, the signing information data proceeds to the next query at box 315.

A voice signal in box 300 moves to speech recognition means 210 where it can end up as text at box 100 or as sign language at box 200. The speech recognition 210 can be a device or a person that could also be familiar with sign language. The text data may then be queried at box 110 and proceed as described above.

Text, sign, and voice signals from their respective reception in boxes 100, 200 and 300 may all need to be transmitted to a different location all together or might need connectivity to an Intranet or the Internet. Therefore, each one of the signals from the boxes 100, 200, and 300 may be forwarded to a transmission means 350 which may transmit each signal to a national public telephone system (NPTS) 400 or to an equivalent wireless dispatch system 500. Invariably, the data ends up on a local premise as indicated by the private branch exchange (PBX) 450. If a hub 24 receives such data in its PBX, then a series of queries occur to see if it is signing language at box 510, to see if it is text at box 520, and to see if it is voice at box 530. If the signal is a signing language signal at box 510, it moves to signing box 200. If the signal is text in box 520, the signal moves to text box 100. Finally, if the signal is voice, it moves to voice box 300 to be transmitted as voice or utilized in conversion to text and/or sign language in box 210. The PBX 450 may also serve local needs of the respective hub 24 when intra-hub transmission is done utilizing the NPTS 400 and/or the wireless network 500, such as when the Internet or an Intranet are utilized within the hub. Otherwise information flowing into the hub 24 is either from an external source, such as government 10 or communication system 18, or is generated within the hub in boxes 610 and 630. If desired, wireless messages in voice, text, or sign language can be originated by wireless or other means, such as telephone, computer, Intranet or Internet means and transmitted to the mobile units and/or the fixed display units by wireless means such as cellular, WIMAX, WIFI, or 3G. A sign language output to display units 700 and/or the mobile units can be with or without text and/or voice. As shown in FIG. 2, messages can be routed from an originator 902 to a telephone relay service (TRS) center 18 via a suitable connection device 904, where it can be converted, such as transliterated, in box 906 into sign language using any suitable means known in the art, such as American sign language using any suitable means known in the art, such as, a human interpreter and/or devices and sent to the output supervisor 130 of the sign language public address and emergency system 8 via dispatch means 908. As can be seen from FIG. 2, the message routing may include a redirect through the public address system 8. Additionally, the Internet and an Internet web site may be used to access the system 8 or transmit or receive messages.

An originating voice or text message may be transmitted to a Video Relay Service (VRS) Center 18. An operator, who can be a sign language interpreter, converts and translates the voice and/or text message into sign language, including American sign language. The center 18 then transmits the sign language signing and/or text and voice to the desired display units, such as units 700 via the output supervisor 130, or the output supervisor 130 of the public address system can redirect to specific chosen display units 700 and/or dispatch to mobile units 660 via the public wireless network 500.

If desired, a global positioning system can be utilized to locate display units 700 and send a message to desired ones of the display units located by the GPS.

Government input 10 is sent to the government priority interrupt box 550 if interruption of local messages is desired for a National emergency broadcast. Such interruption can result either in priority broadcast relegating other messages to second in line or can be inserted as a picture-in-picture window by the operation of the output supervisor 130. The performance of monitoring activities may take place at box 560. Error messages may be assembled in box 540.

Outputs, whether text, voice, advertising images, or signing, arrive at output supervisor 130 in FIG. 4 for clearance and then are propagated to either wireless dispatch in box 660 and/or the splitter and/or booster system 600 so that each output can be split to equal images or signing and text, with or without voice, at various display units 700. Alternatively, the output supervisor 130 may cause an inquiry in box 640 to determine whether the output should be transmitted only to mobile units via wireless dispatch system 500 or determine via box 650 if the output should be transmitted both to mobile units via wireless dispatch system 500 and also the display units 700 utilizing the splitter and booster if needed. The booster enables images, voice and/or text to reach remote displays. Clearance at the output supervisor 130 depends on the controlling effect of the government priority interrupt 550 and the mixing of advertising content from box 555 presented during non-emergency times to get the public used to the display units that interject between commercials signing and its designated purpose during emergency times.

The ISM 20 determines the destination of every piece of information that it receives and guides it to its proper destination, i.e. hub 24. This preferably is done by equipping each message group received by the ISM with an electronic ticket that controls its routing and that could appear as a header. The destinations routed are to the various hubs 24(1) to 24(n), each of which has a number of display units 700 associated with it and dispatch capabilities for mobile units. In one embodiment, the ticket may be composed of 10 entries (slots) as follows:

(a) $1^{st}$ two slots designate the type of destination (01—Airports; 02—schools; 03—TV stations; 04—radio stations; 05—train stations; 06—bus terminals; 07—hospitals; 08—food stores; 09—TBD; and 10—highways);
(b) $3^{rd}$ and $4^{th}$ slots—State;
(c) $5^{rd}$ and $6^{th}$ slots—Town/City;
(d) $7^{th}$ and $8^{th}$ slots—Specific in a group (e.g. hospital #7 or school #2);
(e) $9^{th}$ slot—to be determined (TBD); and
(f) $10^{th}$ slot—a toggle: "0" for clearance; "1" for denial.

As an example, message 0206110401 has the meaning 02 for school; 06 for Connecticut; 11 for New Haven; and 04 for a specific school; 0 for the undetermined (TBD) and 1 for denying clearance for dispatch.

As can be seen from the foregoing description, there has been presented a sign language public addressing and emergency system for the hearing impaired. The system of the present invention solves a long time need for such a system.

The public address system 8 may be used as a two way public address system which allows message recipients to respond to the message originator and send back information or originate an entirely new message. A would-be recipient could initiate a message to a would-be originator that would appear only on his or her display unit. Alternatively, such message could be sent to and appear on other display units in another location. A special number or other means known in the art, such as a link, can be provided in the displayed message for people to respond to. The display units may be equipped with or can be connected to means for such response by people.

IM or ICQ capabilities could be part of the system of the present invention, allowing intranet with means, such as IM or ICQ connectivity and communications among display unit locations as well as Internet connectivity and communications to outside locations, using any protocol known in the art, such as Jabber, and allowing the system's server either to function as a Jabber server as well or connect to one. In one such embodiment, a signing, text, and voice delivering and converting product, such as the SIGNTEL INTERPRETER, is interfaced with Jabber protocol and server and may be utilized after the speech recognition process is concluded, if appropriate, and then connect the text to it. On a leg coming back from another party, it can come also as text that would be heard by the hearing person or seen in sign language. In other words, such a product is enabled to do messaging within the public address dispersed environment by interfacing the text portion of the product to Jabber. Other embodiments to such bi-directional communications with sign language, text and voice could be constructed by any person skilled in the art and embraced here.

Interruptions may come from various expected situations, such as government messages or from other messages, i.e. classroom under siege. Such interruptions can be processed by the public address system of the present invention due to its Internet and Intranet connectivity and general design.

Users activating the public address system of the present invention can choose from one of the following: (i) use the pre-recorded signing capabilities of the system, such as canned messages pertaining to situations; (ii) use live real-time signing by an individual to transmit to the display units; (iii) utilize an external transliterating facility such as a Telephone Relay Service (TRS), a Video Relay Service (VRS), or other communication systems; and/or (iv) utilize means known in the art, such as SIGNTEL INTERPRETER. The public address system has an emergency monitoring facility that switches by default to a preferred activation, such as (i) if either (ii), (iii) or (iv) are unavailable or incapacitated, ensuring at all times functionality of the system during an emergency. The sign language public address and emergency system could enable a display of messages by signing, and/or text, and/or sounded voice on designated display units, as well as on either specifically designated mobile units or any mobile unit within the desired proximity for the announcements.

The display units, whether fixed or mobile, could function both in emergency times as well as in non-emergency times. Non-emergency times could be utilized to alert and educate the public to the existence of the emergency system units and their role during emergency.times. In order to get the public used to consult the display units, during non-emergency times, the public could be exposed to advertising, such as announcements or commercials, utilizing the display units and mixed intermittently with explanations about the sign language and other usages of the display units during emergency times.

To create an incentive for the public to consult the display units from time to time, offerings relevant to the public can be displayed, such as display units in a mall where stores located therein could offer certain discounts tied to the customers consulting the display units in their proximity.

Display units that alert and teach the public about sign language messages and other functions of the emergency system during emergency times and are utilized in non-emergency times for displaying such information mixed with advertising, such as commercials, could be integrated with electronic scheduling of airlines, buses, trains, or stock inventories in stores, all preferably utilizing computerized data enabling usage of local electronic equipment, such as computers and servers with their relevant software to deliver such information or connected to means for doing so.

A firewall may be part of the system of the present invention to protect from unwanted malicious intrusion.

A router may be part of the system. The router directs incoming messages to the desired communication system. The router also directs messages to the desired display units.

The system of the present invention may have security in the form of hardware, software, and human factor to authenticate the message originator, block unwanted messages and malicious intrusion, such as software, approve or deny messages and message originators, register new members to a database and provide security clearance for people who use the system to input a new message and wish to display messages on specific display units. In this way, only approved people may use the system in such places as schools or airports.

The various functions of the system of the present invention may be carried out by any suitable hardware and/or a computer programmed in any desired language to carry out the functions.

It is apparent that there has been provided in accordance with the present invention a sign language public addressing and emergency system which fully satisfies the objects, means, and advantages set forth hereinbefore. While the present invention has been described in the context of specific embodiments thereof, other unforeseeable alternatives, modifications, and variations may become apparent to those skilled in the art having read the foregoing description. Accordingly, it is intended to embrace those alternatives, modifications, and variations which fall within the broad scope of the appended claims.

What is claimed:

1. A system for providing at least one emergency alert(s) comprising: means for receiving a message input from an originator; means for generating a message signal in a form which can be understood by a plurality of hearing impaired persons; and means for transmitting the message signal to at least one display unit in at least one location remote from the message generating means.

2. The system according to claim 1, wherein the message generating means comprises means for generating at least one of emergency messages and public announcements.

3. The system according to claim 1, wherein the message generating means comprises means for creating messages in sign language.

4. The system according to claim 3, wherein the message generating means further comprises means for generating at least one of a text message and a voice message and means for transmitting said sign language message and said at least one of a text message and a voice message to said at least one display unit.

5. The system according to claim 1, wherein said transmitting means includes a splitter for generating multiple signals to be transmitted to multiple display units.

6. The system according to claim 5, wherein said transmitting means includes a booster to allow the signals to be transmitted to remote locations.

7. The system according to claim 1, wherein said system has a plurality of hubs, and said receiving means comprises an incoming supervisor which decides to which one or ones of said hubs said message input is to be sent.

8. The system according to claim 7, wherein each said hub has means for processing text messages, sign language messages, and voice messages and an output supervisor for receiving signals representative of said processed text messages, sign language messages, and voice messages and means for transmitting selected outputs.

9. The system according to claim 8, wherein said means for processing said sign language messages includes means for presenting text and sign language messages in two adjacent windows on at least one of said display units if so instructed.

10. The system according to claim 8 wherein said sign language processing means includes means for a manual interrupt and a camera for capturing manual signing and digital identifier creation means.

11. The system according to claim 7, wherein said means for processing text messages includes means to query if both text and sign language messages are to be presented.

12. The system according to claim 11, wherein said means for processing text messages includes a sign language generator to convert the text messages to messages in sign language.

13. The system according to claim 7, wherein said means for processing voice messages comprises means for converting said voice message into text and sign language and means for transmitting said voice, text and sign language message.

14. The system according to claim 7, further comprising a transceiving means for receiving voice signals from at least one of a said voice input, text signals from said text input, and sign language signals from said sign language input and means for transmitting each of said signals by a system having the means for transmitting to at least one of a public telephone system, a wireless system, an Intranet system, and an Internet system.

15. The system according to claim 14, wherein each said hub has a private branch exchange which has the means for receiving said signals from said at least one of a public telephone system and said wireless system.

16. The system according to claim 7, further comprising means for a government priority interrupt if interruption of local messages is desired and said government priority interrupt means communicating with an output means and supervisor.

17. The system according to claim 16, further comprising means for monitoring performance connected to said output means and supervisor and a means for assembling error messages.

18. The system according to claim 7, wherein said incoming supervisor equips each incoming message group with an electronic ticket that controls its routing.

19. The system according to claim 18, wherein said electronic ticket has a plurality entry slots for designating a type of destination, a state, a town or city, a type of institution, and a toggle.

20. The system according to claim 1, wherein different messages are forwarded by an output supervisor to at least one of different display units.

21. The system according to claim 1, wherein said message generating means comprises at least one of a TRS and a VRS with an interpreter for converting at least one of voice and text to sign language, wherein said transmitting means comprises means for transmitting said sign language generated by said interpreter to at least one of display units and mobile units.

22. The system according to claim 1, further comprising said at least one display unit comprising a mobile unit.

23. The system according to claim 1, further comprising means for displaying advertising and intermittent explanation about said system on said at least one display unit.

24. The system according to claim 23, further comprising said at least one display unit forming part of at least one electronic display(s) located in at least one of a transportation facility, a store, and a mall.

25. The system according to claim 24, further comprising means for displaying incentives on said at least one display unit.

26. The system according to claim 1, further comprising means for communicating by at least one of ICQ and IM and means for utilizing a Jabber protocol for at least one of Intranet communications and Internet communications.

27. The system according to claim 1, further comprising a GPS system for locating said at least one display unit.

28. The system according to claim 1, wherein different messages are forwarded by an output supervisor to at least one wireless unit.

29. The system according to claim 1, wherein said means for receiving message input comprising at least one of a public telephone system and a wireless system.

30. The system according to claim 1, wherein said receiving means comprises means for receiving at least one of a text, Voice, Video, at least one vibration(s), and at least one tone(s).

31. The system according to claim 21, wherein said interpreter converts sign language to at least one of voice and text.

\* \* \* \* \*